(12) United States Patent
De La Mora Ramirez et al.

(10) Patent No.: US 9,297,408 B2
(45) Date of Patent: Mar. 29, 2016

(54) COUPLING SPACER, ASSEMBLY, AND METHOD

(71) Applicant: GM GLOBAL TECHNOLOGY OPERATIONS LLC, Detroit, MI (US)

(72) Inventors: Rodolfo De La Mora Ramirez, Toluca (MX); Diego A. Esquivel Lopez, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 221 days.

(21) Appl. No.: 14/168,472

(22) Filed: Jan. 30, 2014

(65) Prior Publication Data

US 2015/0211569 A1      Jul. 30, 2015

(51) Int. Cl.
    *F16B 43/02*      (2006.01)
    *F16B 5/02*       (2006.01)
    *F16B 21/08*      (2006.01)

(52) U.S. Cl.
    CPC . *F16B 43/02* (2013.01); *F16B 5/02* (2013.01); *F16B 21/086* (2013.01); *Y10T 29/49947* (2015.01)

(58) Field of Classification Search
    CPC .......... F16B 43/02; F16B 5/02; F16B 21/086; Y10T 29/29947
    USPC ................................ 411/546, 547; 403/408.1
    See application file for complete search history.

(56) References Cited

U.S. PATENT DOCUMENTS

| | | | | |
|---|---|---|---|---|
| 5,288,191 A * | 2/1994 | Ruckert | ................ | F16B 5/0233 403/409.1 |
| 5,536,125 A * | 7/1996 | Gaw, Jr. | ................ | F16B 5/0241 411/112 |
| 5,749,669 A * | 5/1998 | Ketteler | ................... | F16B 5/02 403/12 |
| 6,238,127 B1 * | 5/2001 | Jhumra | ..................... | F16B 5/02 384/295 |
| 6,585,447 B2 * | 7/2003 | Schwarzbich | ........ | F16B 5/0233 403/299 |
| 6,886,799 B2 * | 5/2005 | Yamanashi | ........ | B60H 1/00535 248/300 |
| 7,568,868 B2 * | 8/2009 | Motsch | ................. | F16B 37/041 411/112 |
| 8,944,736 B2 * | 2/2015 | Figge | .................... | F16B 5/0233 224/322 |

* cited by examiner

*Primary Examiner* — Gary Estremsky
(74) *Attorney, Agent, or Firm* — Quinn Law Group, PLLC

(57) ABSTRACT

A coupling spacer includes a spacer body defining a first edge and a second edge opposite the first edge. The spacer body has a tapered shape. Further, the coupling spacer includes a spacer flange extending outwardly from the spacer body. The spacer flange is closer to the first edge than the second edge. The coupling spacer additionally includes at least one snap feature extending outwardly from the spacer body. The snap feature is closer to the second edge than the first edge.

9 Claims, 8 Drawing Sheets

COUPLING SPACER, ASSEMBLY, AND METHOD

TECHNICAL FIELD

The present disclosure relates to a coupling spacer.

BACKGROUND

A coupling spacer may be used to couple components that are separated from each other. Aside from aiding in coupling the components together, the coupling spacer may fill a void between these components. In vehicle manufacturing, for example, a coupling spacer may be used to interconnect spaced apart vehicle components.

SUMMARY

It is useful to couple components that are separated from each other. For example, during the assembly of a vehicle, such as a car, spatial constraints may limit where a component may be positioned relative to another component. As a consequence, the vehicle components may be spaced apart from each other during assembly. As a non-limiting example, a first component may have a barrier, such as a flange, that prevents a second component from being positioned close to the first component during assembly, causing the first and second components to be spaced apart from each other. Even though the first and second components are spaced apart from each other, these components may still need to be coupled to each other. It is therefore useful to develop a coupling spacer capable of aiding in coupling components that are spaced apart from each other.

In an embodiment, the coupling spacer includes a spacer body defining a first edge and a second edge opposite the first edge. The spacer body has a substantially a frusto-conical shape. Further, the coupling spacer includes a spacer flange extending outwardly from the spacer body. The spacer flange is closer to the first edge than the second edge. The coupling spacer additionally includes at least one snap feature extending outwardly from the spacer body. As a non-limiting example, the coupling spacer may include two snap features. Irrespective of the specific number of snap features, the snap features are closer to the second edge than the first edge.

The present disclosure also relates to an assembly. In an embodiment, the assembly includes a first component. The first component includes a first component body and a retaining wall extending from the first component body. The assembly further includes a second component. The second component includes a second component body and an extension protruding from the second component body. The second component defines a hole. The hole extends through the extension. The assembly further includes a coupling spacer disposed between the first and second components. In this embodiment, the coupling spacer includes a spacer body partially disposed in the hole. The spacer body defines a first edge and a second edge opposite the first edge. The coupling spacer further includes a spacer flange extending outwardly from the first edge. The spacer flange is in contact with the extension. The coupling spacer also includes at least one snap feature extending from the spacer body. The snap feature includes a retention surface and is closer to the second edge than to the first edge. The assembly further includes a first fastener partially disposed in the spacer body. In addition, the assembly includes a second fastener attached to the retaining wall of the first component. The first fastener is coupled to the second fastener.

The present disclosure also relates to a method for coupling a first component to a second component using the coupling spacer described above. The method includes providing the coupling spacer, the first fastener, the first component, the second component, and the second fastener as described above. The second fastener is attached to the retaining wall of the first component. As discussed above, the coupling spacer includes a spacer body. The second component includes a second component body (as discussed above) and an extension protruding from the second component body. Further, the second component defines a hole extending through the extension. The method further includes advancing the spacer body through the hole until the retention surface abuts the extension. Additionally, the method includes advancing the second component toward the first component until the spacer body is substantially aligned with the second fastener. Moreover, the method includes advancing the spacer body toward the first component through the hole until the spacer flange of the coupling spacer contacts the extension of the second component. Also, the method includes advancing the first fastener toward the first component through the spacer body until the first fastener engages the second fastener.

The above features and advantages and other features and advantages of the present invention are readily apparent from the following detailed description of the best modes for carrying out the invention when taken in connection with the accompanying drawings.

DETAILED DESCRIPTION

Figure 1:
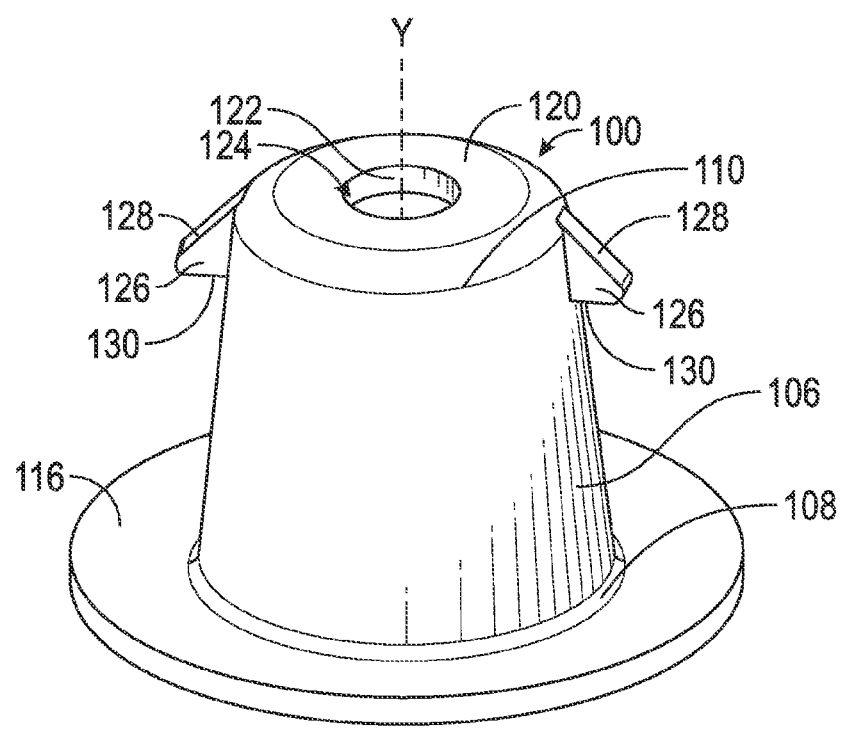
FIG. 1 is a schematic, perspective view of a coupling spacer.
Figure 2:
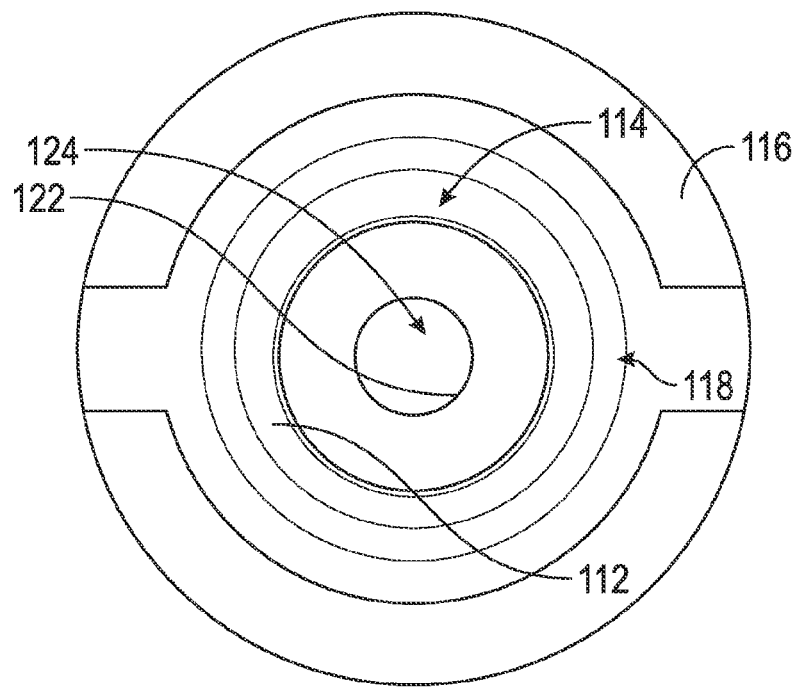
FIG. 2 is a schematic, bottom view of the coupling spacer shown in FIG. 1.

Referring to the drawings, wherein like reference numbers refer to like components, FIGS. 1 and 2 schematically illustrates a coupling spacer 100 for aiding in coupling a first component 102 (FIG. 3) to a second component 104 (FIG. 3) as discussed in detail below. The coupling spacer 100 may be an integral structure (i.e., one-piece structure) and includes a spacer body 106 wholly or partly made of substantially rigid material, such as a rigid polymer or metal. The spacer body 106 may have a substantially frusto-conical shape. The term "fursto-conical shape" refers to a shape of a frustum of a cone. The term "frustum" refers to a part of a solid intersected between two parallel planes. It is envisioned, however, that the spacer body 106 may have other suitable tapered shapes such as square or rectangular so long as the spacer body 106 has tapered vertical walls. The spacer body 106 may have any suitable tapered shape such as pyramidal, frusto-pyramidal, conical, paraboloidal, pentagonal, among others. For purposes of this disclosure, the term "tapered shape" refers to any shape in which a surface extends from a first end to a second end, where the area of the first end is larger than the area of the second end. Regardless of its shape, the spacer body 106 may extend along a longitudinal axis Y and defines a first or bottom edge 108 and a second or top edge 110 opposite the first edge 108. The first edge 108 is spaced apart from the second edge 110 along the longitudinal axis Y. The first edge 108 may have a larger perimeter (e.g., circumference) than the second edge 110. The spacer body 106 may be substantially hollow and defines an internal surface 112. The internal surface 112 defines an internal cavity 114. The internal cavity 114 may have a substantially frusto-conical shape.

The coupling spacer 100 further includes a first or bottom wall 116 extending outwardly from the spacer body 106. The first spacer flange 116 may be closer to the first edge 108 than the second edge 110. As a non-limiting example, the first spacer flange 116 may extend from the first edge 108 of the spacer body 106. Irrespective of its specific location relative to the spacer body 106, the first spacer flange 116 extends from the spacer body 106 in a direction away from the inner cavity 114 (i.e., a radially outward direction). The first spacer flange 116 may have a substantially annular shape and is not necessarily flat. As a non-limiting example, the first spacer flange 114 may have a substantially concave shape (see FIG. 4).

The first spacer flange 116 defines a first or bottom opening 118 in communication with the internal cavity 114. Accordingly, the first spacer flange 116 may completely surround the first opening 118 and the first edge 108. In this disclosure, the first spacer flange 116 may also be simply referred to as the spacer flange.

The coupling spacer 100 further includes a second or top wall 120 extending inwardly from the second edge 110. The second spacer flange 120 may be substantially flat and partially covers the internal cavity 114 defined by the spacer body 106. In the depicted embodiment, the second spacer flange 120 is coupled to the entire second edge 110 and may have a substantially annular shape. Further, the second spacer flange 120 defines an internal wall surface 122. The internal wall surface 122 defines a second or top opening 124. Thus, the second opening 124 extends through the second spacer flange 120. In the depicted embodiment, the second opening 124 has a substantially circular shape. It is nonetheless contemplated that the second opening 124 may have other suitable shapes.

In addition to the second spacer flange 120, the coupling spacer 100 includes at least one snap feature 126 extending from the spacer body 106. The snap features 126 may be referred to as snap fit snap features or snap feature or protrusions. In the depicted embodiment, the coupling spacer 100 includes two snap features 126 in a diametrically opposite relation to each other. However, the coupling spacer 100 may include more or fewer snap features 126 extending from different locations of the spacer body 106. Each snap feature 126 may include a ramp 128 and a retaining surface 130 upon which the spacer body 106 is temporarily supported. The ramp 128 may be obliquely angled relative to the longitudinal axis Y and the retaining surface 130. Accordingly, the retaining surface 130 may be obliquely angled relative to the ramp 128. The retaining surface 130 is configured to abut the second component 104 (FIG. 3) in order to maintain the coupling spacer 100 coupled to the second component 104 at a first position (FIG. 6) as discussed in detail below.

Figure 3:
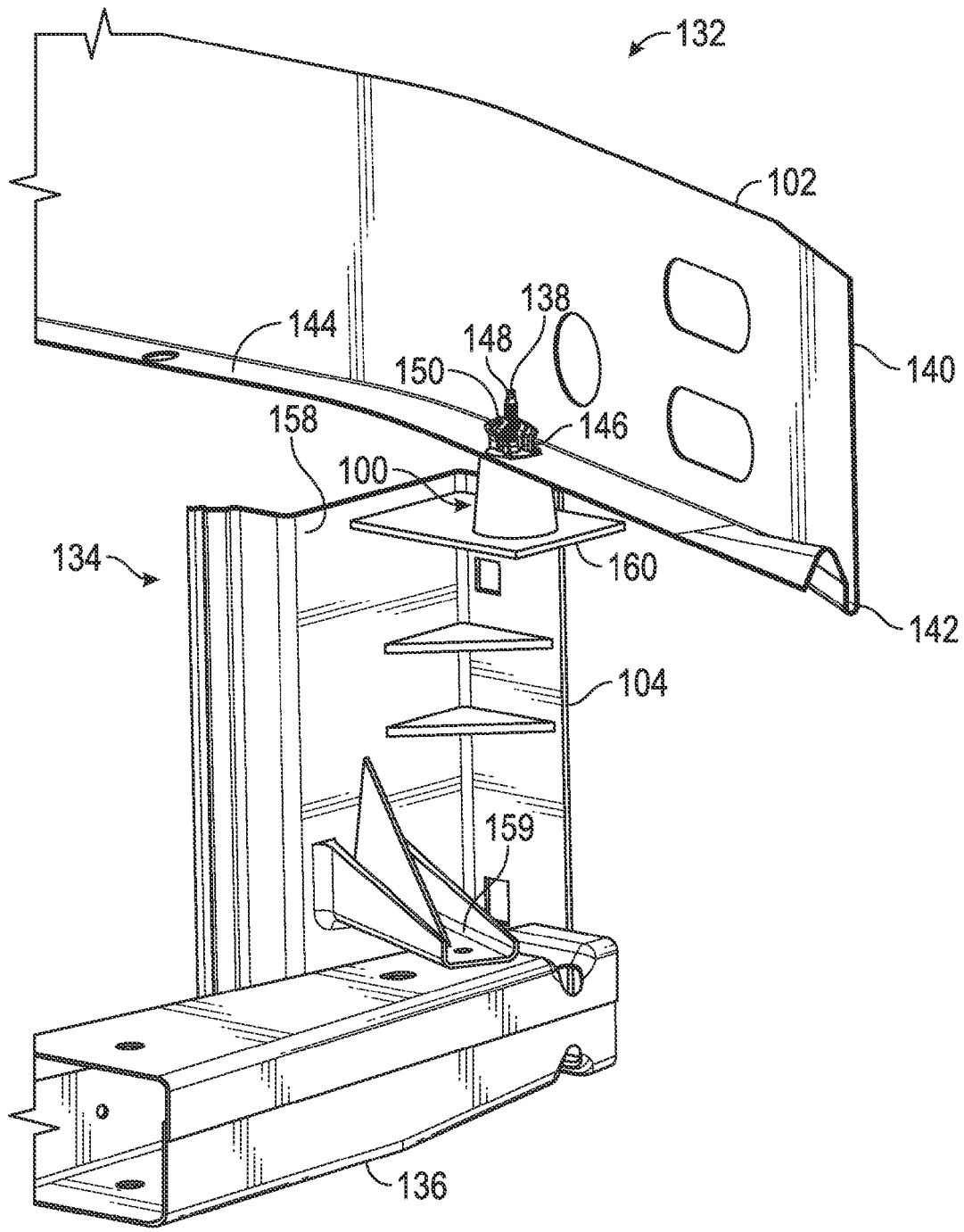
FIG. 3 is a schematic, perspective view of an assembly including a first component, a second component, a third component, a first fastener, a second fastener, and the coupling spacer of FIG. 1 disposed between the first component and the second component.
Figure 4:
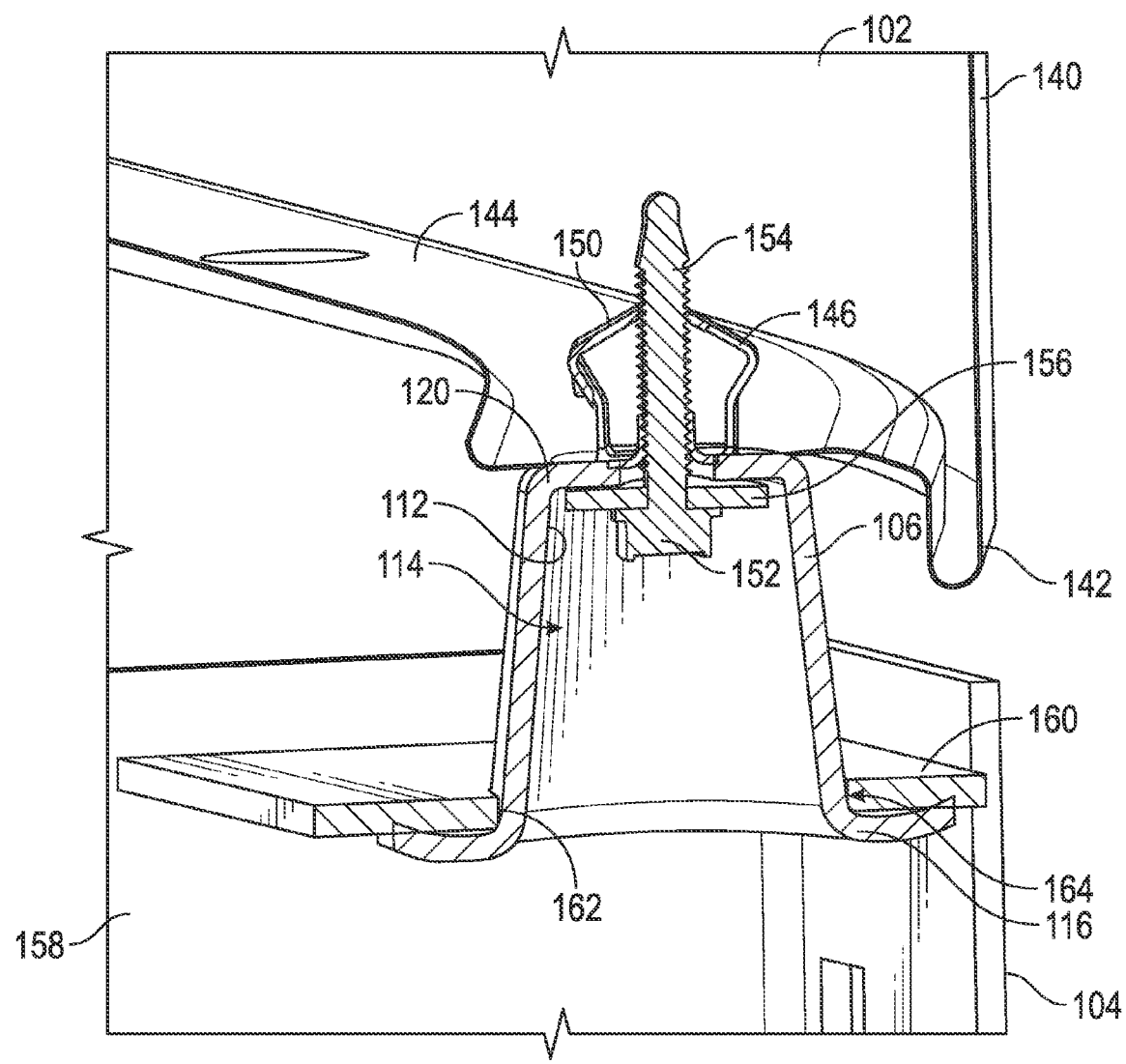
FIG. 4 is a schematic, enlarged cross-sectional view of a portion of the assembly shown in FIG. 3, depicting the first component, the second component, the first fastener, the second fastener, and the coupling spacer shown in FIG. 3.

With reference to FIGS. 3 and 4, the coupling spacer 100 may be a part of an assembly 132. The assembly 132 may be part of a vehicle 134 and includes the first component 102, the second component 104, a third component 136, the coupling spacer 100, and a first fastener 138. The first component 102 may be, for example, a bumper beam. The third component 136 may be, for example, a suspension rail. The second component 104 may be a baffle.

The first component 102 includes a first component body 140 and a barrier 142 extending from the first component body 140. As a non-limiting example, the barrier 142 may be a flange. Aside from the barrier 142, the first component 102 includes a retaining wall 144. The retaining wall 144 may be substantially perpendicular to the barrier 142.

The first component 102 further includes a second fastener 146 coupled to the retaining wall 144. The second fastener 146 is configured to be coupled to the first fastener 138. In the depicted embodiment, the first fastener 138 is a screw 148, and the second fastener 146 is a nut 150 configured to mate with the screw 148. Specifically, the depicted nut 150 is an expansion nut. The screw 148 includes a head 152 and a threaded shaft 154 coupled to the head 152. The threaded shaft 154 can be coupled to the nut 150 in order to couple the coupling spacer 100 to the first component 102. The assembly 132 may further include a washer 156 disposed between the head 152 and the second spacer flange 120 of the coupling spacer 100.

The second component 104 includes a second component body 158 and an extension 160 configured to engage the coupling spacer 100. The extension 160 may be configured as a plate and may be wholly or partly made of a substantially rigid material, such as a rigid polymer or rigid metal. The extension 160 defines an internal extension surface 162 (see also FIG. 5). The internal extension surface 162 defines a hole 164 (see also FIG. 5). The hole 164 is configured, shaped, and sized to receive at least a portion of the coupling spacer 100. Specifically, the hole 164 is configured, shaped, and sized to receive at least a portion of the spacer body 106. In the depicted embodiment, the hole 164 is substantially circular. However, the hole 164 may have other suitable shapes so long as it is capable of receiving at least a portion of the spacer body 106. The second component 104 may also include a supporting bracket 159 extending from the second component body 158. The supporting bracket 159 is configured to contact the third component 136.

Figure 6:
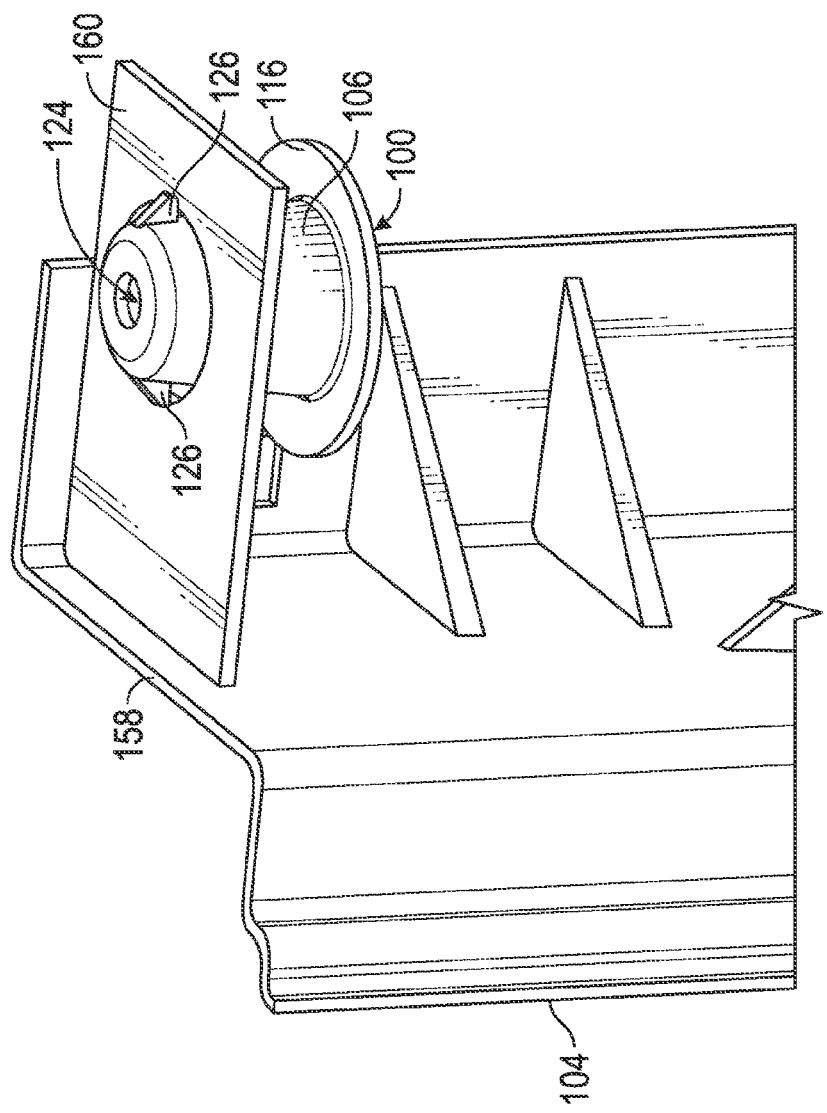
FIG. 6 is a schematic, perspective view of the coupling spacer coupled to the second component, wherein the coupling spacer is at a first position relative to the second component.
Figure 5:
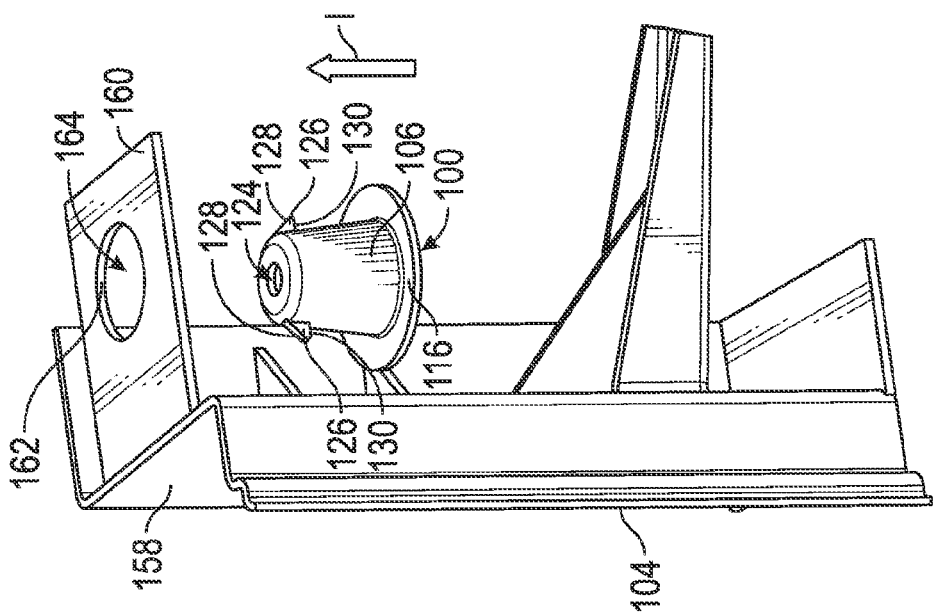
FIG. 5 is a schematic, perspective view of the second component and the coupling spacer being moved toward a hole defined by the second component.

With reference to FIGS. 5-10, the present disclosure also relates to a method of assembling the assembly 132 (FIG. 3). First, the method includes providing the coupling spacer 100, the first component 102, the second component 104, third component 136, and first fastener 138. As used herein, the term "providing" means making available. To make an object (e.g., coupling spacer 100) available, the user may receive the object or may manufacture the object. After providing the first component 102, the second component 104, third component 136, and first fastener 138, the coupling spacer 100 is advanced toward the second component 104 in the direction indicated by arrow I as shown in FIG. 5. Specifically, the spacer body 106 is advanced through the hole 164 of the second component 104 until the retention surfaces 130 of each snap feature 126 contact (e.g., abut) the extension 160. As the spacer body 106 moves through the hole 164, the ramps 128 may contact the internal extension surface 162. Further, while the ramps 128 contact the internal extension surface 162, the snap features 126 may elastically deform (i.e., compress) to allow passage of the coupling spacer 100 through the hole 164. Once the ramps 128 of each snap feature 126 no longer contact the internal extensions surface 162, the snap features 128 return to their original shape, allowing the retention surfaces 130 to at least be disposed over the extension 160. At this point, the retention surfaces 130 of the snap features 126 may contact the extension 160, thereby coupling the coupling spacer 100 to the second component 104 at a first position as shown in FIG. 6.

Figure 7:
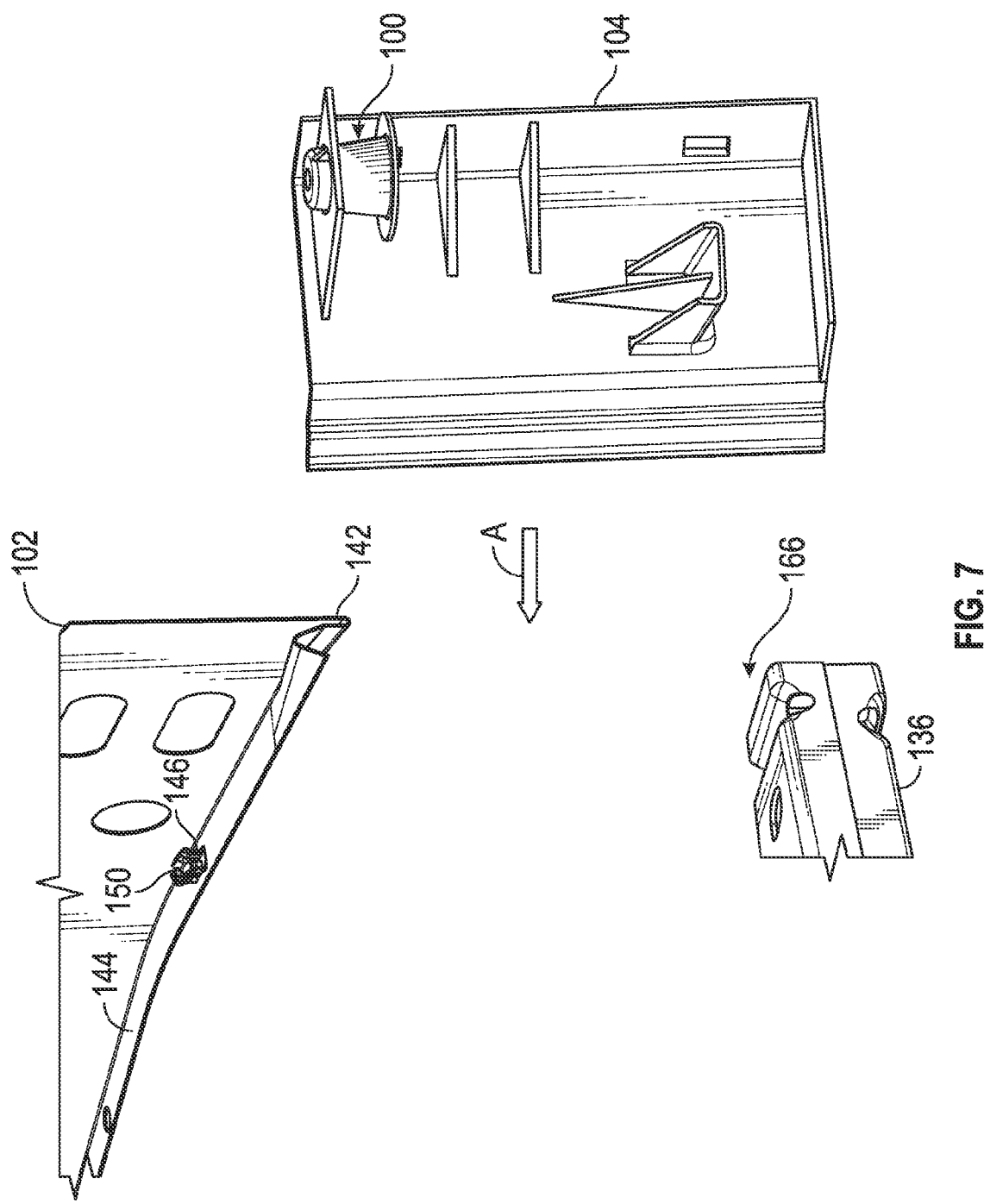
FIG. 7 is a schematic, perspective view of the second component being advanced toward a location between the first and third components.
Figure 8:
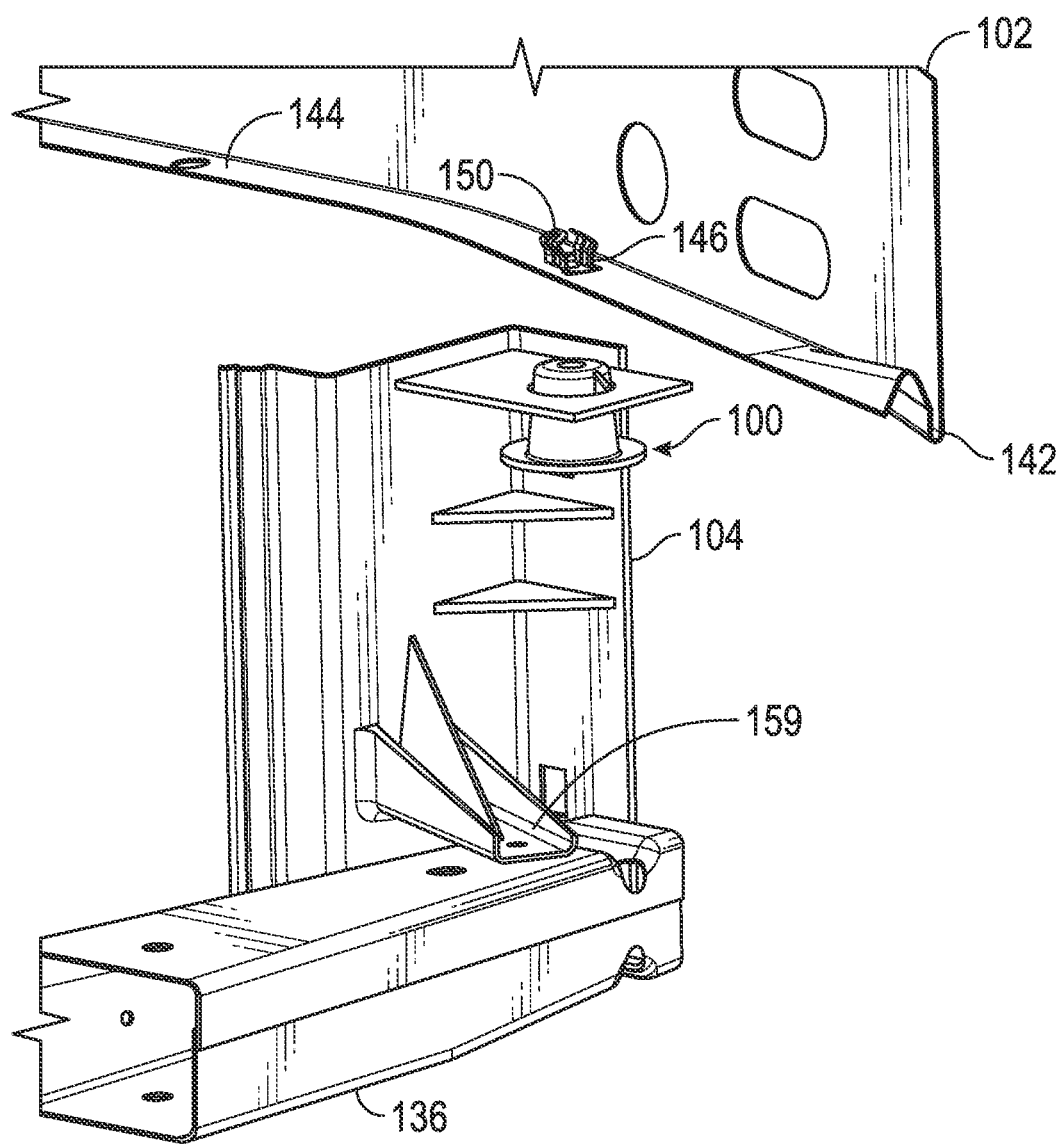
FIG. 8 is a schematic, perspective view of the assembly, depicting the coupling spacer decoupled from the first component but coupled to the second component.

Once the coupling spacer 100 is coupled to the second component 104 at a first position as shown in FIG. 6, the second component 104 and the coupling spacer 100 are advanced toward the first component 102 in the direction indicated by arrow A as shown in FIG. 7. At this point, the first component 102 and third component 136 may be located at a fixed position relative to each other. In particular, the first component 102 and third component 136 may be spaced apart from each other so as to define a gap 166 between them. The second component 104 and the coupling spacer 100 can be moved toward the gap 166 defined between the first component 102 and third component 136. In other words, the second component 104 and coupling spacer 100 are advanced to a location between the first component 102 and third component 136. The second component 104 is configured, shaped, and sized to be received in the gap 166 between the first component 102 and the third component 136. Accordingly, the barrier 142 does not impede the movement of the second component 104 toward the gap 166 in the direction indicated by arrow A. As discussed above, the coupling spacer 100 can help fill any voids between the second component 104 and the retaining wall 144 once the second component 104 is disposed between the first component 102 and the third component 136 as shown in FIG. 8. When the second component 104 is disposed between the first component 102 and the third component 136, the spacer body 106 (FIG. 1) is substantially aligned with the second fastener 146, and the supporting bracket 159 of the second component 104 may contact the third component 136 to couple the second component 104 to the third component 136. Thus, the method includes advancing the second component 104 and the coupling spacer 100 toward the first component 102 until the spacer body 106 is substantially aligned with the second fastener 146 (e.g., nut 150).

As shown in FIG. 8, the second component 104 is advanced toward the first component 102 until the spacer body 106 is substantially aligned with the second fastener 146 (e.g., nut 150), thereby allowing the first fastener 138 to be inserted through the spacer body 106 and into engagement with the second fastener 146. Specifically, the second component 104 is advanced toward the first component 102 until the second opening 124 (FIG. 1) is substantially aligned with the second fastener 146 (e.g., nut 150), thereby allowing the first fastener 138 to be inserted through the second opening 124 (FIG. 4) and to be coupled to the second fastener 146.

Figure 9:
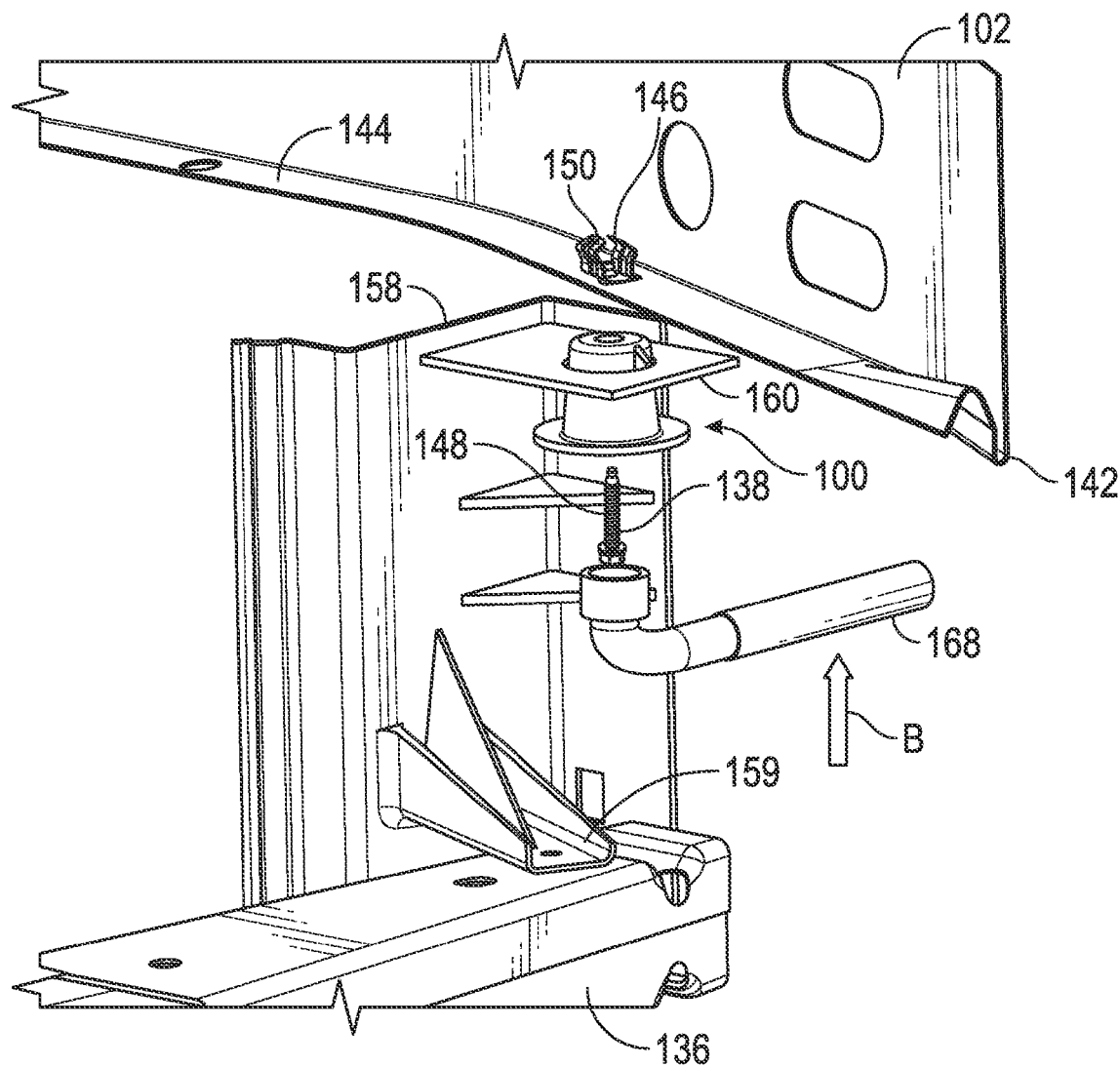
FIG. 9 is a schematic, perspective view of the assembly, a driving tool, and the first fastener, wherein the driving tool is being advanced toward the first fastener and the coupling spacer.
Figure 10:
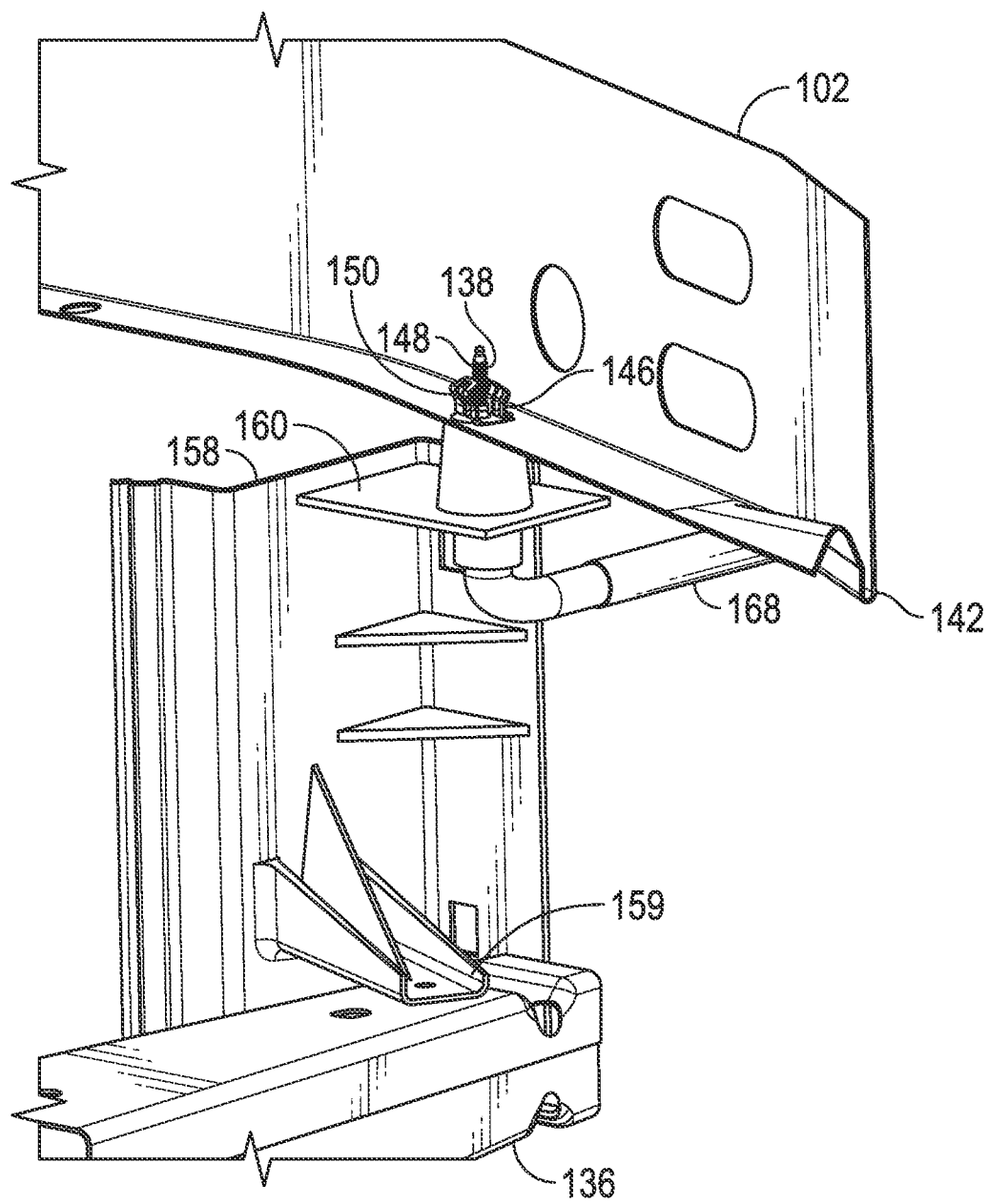
FIG. 10 is a schematic, perspective view of the assembly, the driving tool, and the first fastener, wherein the driving tool has advanced the coupling spacer to a second position relative to the second component, the coupling spacer is coupled to the first component and the second component, and the first fastener is coupled to the second fastener that is coupled to the first component.

Next, the first fastener 138 is advanced toward the first component 102 through the coupling spacer 100 in the direction indicated by arrow B as shown in FIG. 9. Specifically, the first fastener 138 (e.g., screw 148) is moved through the first opening 118 (FIG. 2), the internal cavity 114 (FIG. 2), the second opening 124 (FIG. 1), and the retaining wall 144 of the first component 102 as shown in FIG. 9. To do so, a driving tool 168, such as a powered screwdriver, may be used to advance the first fastener 138 (e.g., screw 148) toward the first component 102 through the coupling spacer 100 in the direction indicated by arrow B. If the first fastener 138 is a screw 148, the driving tool 168 may also turn (i.e., spin) the screw 148 while the screw 148 is advanced toward the first component 102 through the coupling spacer 100. As the first fastener 138 is advanced toward the first component 102 through the coupling spacer 100, the driving tool 168 may simultaneously advance the coupling spacer 100 (e.g., spacer body 106) through the hole 164 from the first position (FIG. 9) toward a second position (FIG. 10). The tapered shape (e.g., frusto-conical shape) of the spacer body 106 facilitates insertion of the spacer body 106 through the hole 164. When the coupling spacer 100 is in the first position relative to the second component 104, the retaining surfaces 130 of the snap features 126 (FIG. 1) contact the extension 160, thereby securing the coupling spacer 100 to the second component 104. Thus, the snap features 126 are configured to retain the coupling spacer 100 in a first position relative to the second component 104. When the coupling spacer 100 is in the second position relative to the second component 104, the retaining surfaces 130 of the snap features 126 do not contact the extension 160. Rather, when the coupling spacer 100 is in the second position relative to the second component 104, the first spacer flange 116 may contact the extension 160 in order to help maintain the coupling spacer 100 at the second position (FIG. 10) relative to the second component 104 Also, when the coupling spacer 100 is in the second position relative to the second component 104, the second spacer flange 120 (FIG. 1) of the coupling spacer 100 may contact the retaining wall 144 of the first component 102. The spacer body 106 may be advanced toward the first component 102 through the hole 164 until the first spacer flange 116 contacts the extension 160.

As shown in FIGS. 9 and 10, the first fastener 138 is advanced toward the first component 102 through the coupling spacer 100 (including the second opening 124) until the first fastener 138 operatively engages the second fastener 146, causing the first fastener 138 to be coupled to the second fastener 146. In other words, the first fastener 138 may be advanced toward the first component 102 through the spacer body 106 until the first fastener 138 engages the second fastener 146. Consequently, the first fastener 138 couples the second component 104 to the first component 102 via the coupling spacer 100. For example, if the first fastener 138 is a screw 148 and the second fastener 146 is a nut 150, the screw 148 is advanced toward the first component 102 through the coupling spacer 100 until the screw 148 engages the nut 150, causing the screw 148 to be threadedly coupled to the nut 150. As a consequence, the screw 148 couples the second component 104 to the first component 102 via the coupling spacer 100.

Next, the driving tool 168 is decoupled from the first fastener 138 as shown in FIG. 3. At this point, the first fastener 138 is coupled to the second fastener 146, thereby coupling the first component 102 to the second component 104 via the coupling spacer 100. The coupling spacer 100 allows the first component 102 to be coupled to the second component 104 even if the first component 102 is spaced apart from the second component 104 as shown in FIG. 4.

While the best modes for carrying out the invention have been described in detail, those familiar with the art to which this invention relates will recognize various alternative designs and embodiments for practicing the invention within the scope of the appended claims.

The invention claimed is:

1. An assembly, comprising:
   a first component including a first component body and a retaining wall extending from the first component body;
   a second component including a second component body and an extension protruding from the second component body, the second component defining a hole, wherein the hole extends through the extension;
   a coupling spacer disposed between the first and second components, wherein the coupling spacer includes:
      a spacer body partially disposed in the hole, the spacer body defining a first edge and a second edge opposite the first edge;
      a spacer flange extending outwardly from the first edge, wherein the spacer flange is in contact with the extension; and
      at least one snap feature extending from the spacer body, wherein the at least one snap feature is closer to the second edge than to the first edge;
   a first fastener partially disposed in the spacer body; and
   a second fastener attached to the retaining wall, wherein the first fastener is coupled to the second fastener.

2. The assembly of claim 1, wherein the spacer flange has a concave shape.

3. The assembly of claim 2, wherein the spacer flange has a substantially annular shape and completely surrounds the first edge.

4. The assembly of claim 1, wherein the first fastener is a screw, the second fastener is a nut, and the screw is coupled to the nut.

5. The assembly of claim 2, wherein the spacer flange is a first spacer flange, and the coupling spacer further includes a second spacer flange extending inwardly from the second edge.

6. The assembly of claim 5, wherein the coupling spacer defines an opening extending through the second spacer flange, the opening being configured to partially receive the first fastener.

7. The assembly of claim 6, wherein the second spacer flange is in contact with the retaining wall.

8. The assembly of claim 1, wherein the at least one snap feature includes a ramp and a retention surface, the retention surface being obliquely angled relative to the ramp.

9. A method for coupling a first component to a second component using a first fastener, the first component including a first component body, a retaining wall extending from the first component body, a second fastener attached to the retaining wall, the second component including a second component body, an extension protruding from the second component body, the second component defining a hole, the hole extending through the extension, the method comprising:
   advancing a spacer body of a coupling spacer through the hole until at least one snap feature abuts the extension, wherein the coupling spacer includes:
      the spacer body, the spacer body defining a first edge and a second edge opposite the first edge;
      a spacer flange extending outwardly from the first edge; and
      the at least one snap feature, the at least one snap feature being closer to the second edge than to the first edge, the at least one snap feature including a retention surface upon which the spacer body is temporarily supported;
   advancing the second component toward the first component until the spacer body is substantially aligned with the second fastener;
   advancing the spacer body toward the first component through the hole until the spacer flange contacts the extension; and
   advancing the first fastener toward the first component through the spacer body until the first fastener engages the second fastener.

* * * * *